United States Patent [19]

Dampier et al.

[11] 4,351,888

[45] Sep. 28, 1982

[54] ELECTROCHEMICAL CELL

[75] Inventors: Frederick W. Dampier, Waltham; Risty T. Kalivas, Peabody, both of Mass.

[73] Assignee: GTE Laboratories Incorporated, Waltham, Mass.

[21] Appl. No.: 288,612

[22] Filed: Jul. 30, 1981

[51] Int. Cl.³ .............................................. H01M 6/14
[52] U.S. Cl. ..................................... 429/62; 429/101; 429/196
[58] Field of Search .................. 429/61, 62, 101, 105, 429/196

[56] References Cited

U.S. PATENT DOCUMENTS

| | | | |
|---|---|---|---|
| 3,993,501 | 10/1976 | Kalnoki-Kis | 429/48 |
| 4,075,400 | 2/1978 | Fritts | 429/62 |
| 4,209,571 | 6/1980 | Bessett et al. | 429/62 |
| 4,277,545 | 7/1981 | Kalnoki-Kis | 429/48 |
| 4,278,741 | 7/1981 | Kalnoki-Kis | 429/48 |
| 4,318,969 | 3/1982 | Peled et al. | 429/105 |

Primary Examiner—Donald L. Walton
Attorney, Agent, or Firm—David M. Keay

[57] ABSTRACT

A primary electrochemical cell having an oxidizable anode, for example lithium, and an electrolytic solution including a reducible liquid cathode material, for example thionyl chloride. An additive material, for example polyvinyl chloride, in the form of a gel of polyvinyl chloride and the reducible liquid cathode material is dispersed throughout the electrolytic solution. When the temperature of the cell rises due to abnormal conditions, such as those present during a short circuit, the additive material dissolves in the solution limiting the current flow within the cell.

10 Claims, 7 Drawing Figures

ELECTROCHEMICAL CELL

BACKGROUND OF THE INVENTION

This invention relates to electrochemical cells. More particularly, it is concerned with high power primary electrochemical cells having an oxidizable anode, for example lithium, and a reducible liquid cathode material, for example thionyl chloride.

Electrochemical cells which employ soluble or liquid cathode materials have undergone rapid development in recent years. In these cells the active cathode material is a fluid solvent and the active anode material is a highly electropositive metal, such as lithium. An electrolyte solute is dissolved in the solvent cathode material to provide electrical conductivity. During discharge the solvent is electrochemically reduced on a cathode current collector to yield ions from the anode to form insoluble metal salts, e.g., metal halides.

One particular type of electrochemical cell of the foregoing class contains an anode of lithium and a reducible liquid cathode of thionyl chloride. Typically the electrolyte solute dissolved in the solvent is lithium tetrachloroaluminate. These electrochemical cells have proven to have outstanding weight and volume energy density. The lithium anode and the cathode current collector are relatively thin, less than 1 and 2 mm, respectively. Thus, these cells have a high electrode surface to volume ratio and, therefore, very high power capability.

When such a cell becomes short circuited, either internally or externally, very high short circuit currents flow through the cell. These currents cause heating of the components within the cell which may be sufficient to cause melting of some of the materials. Lithium melts at about 180° C. Molten lithium may react with the thionyl chloride or with the discharge products produced within the cell in a violent chemical reaction with possible undesirable consequences.

A number of approaches have been proposed to resolve the problems which occur when lithium batteries become overheated during abnormal high rate operation as under short circuit conditions. Pressure sensitive vents which open to the atmosphere when the vapor pressure of the electrolyte builds up with increasing cell temperature have been investigated. Current sensitive and thermally sensitive fuses have been installed within the cell. Other techniques which have been employed include fabricating the lithium anode as an alloy with other materials and also altering the concentration of the solute in the electrolytic solution. While these various techniques assist in solving the problem for various situations, under certain conditions they are either difficult to employ or introduce additional problems.

SUMMARY OF THE INVENTION

An electrochemical cell in accordance with the present invention provides a greater tolerance to abnormal temperature levels, as caused for example by short circuit conditions, by limiting the current which flows through the cell. A cell in accordance with the invention includes an oxidizable anode material and a cathode current collector. An electrolytic solution which is in contact with the anode material and the cathode current collector comprises a solvent of a reducible liquid cathode material with an electrolyte solute dissolved therein. The cell also includes an additive which is dispersed throughout the electrolytic solution. The additive includes material which is substantially insoluble in the electrolytic solution during normal operation of the cell and which becomes soluble in the electrolytic solution at temperatures above the temperature produced by normal operation of the cell. The insoluble material does not interfere with operation of the cell under normal conditions of current and temperature. However, as the temperature of the cell rises due to abnormal conditions, such as those present during a short circuit, the material of the additive dissolves in the solution limiting the current flow within the cell.

Thus, overheating and thermal runaway of a high rate lithium cell can be prevented by the electrolyte additive. The material of the additive has a low solubility and is inert at temperatures below approximately 70° C. but dissolves at elevated temperatures above about 100° C. and reduces the power output of the cell. When the material of the additive dissolves, it limits the electrode current densities by reducing ionic transport in the electrolyte solution. The additive has a molecular structure such that on dissolution it raises the viscosity of the electrolytic solution and thereby hinders ionic transport by both electrical conduction and by diffusion.

It has been discovered that partially halogenated alkane polymers with molecular weights above 500 meet the requirements for such an additive material. The high molecular weight makes the polymer difficult to dissolve at room temperature and causes the viscosity of the electrolytic solution to increase on dissolution much more than would be the case for the dissolution of an equal weight of a low molecular weight compound. It has been discovered that polyvinyl chloride, polyvinylidene chloride-vinyl chloride copolymer (Saran B) and chlorinated polyethylene are stable in lithium tetrachloroaluminatethionyl chloride electrolytic solution and thionyl chloride gels of these polymers have the proper solubility characteristics from 25° to approximately 150° C. to substantially lower the viscosity of the solution on dissolution so as to be suitable as thermally activated additives for purposes of the present invention.

Other organic polymers may also be used as additives in electrochemical cells of this general type in order to control overheating. In principle any polymer would be suitable which is chemically stable towards the electrolytic solution and the anode material (lithium) and which has the proper solubility behavior from about 25° C. to approximately 160° C. Preferred polymers have certain structural characteristics such as a molecular weight and the optimum number, length, and position of side chains so that the effect of a given weight of dissolved polymer on the viscosity of the electrolytic solution is maximized. For the selected polymers to be soluble in the electrolytic solution it is important that the polymer molecules not be cross-linked or have extremely high molecular weights. Branching with many long chains tends to decrease the intrinsic viscosity of a given polymer and is generally not preferred for most applications. However, the effect of branching on viscosity is very complex and dependent on temperature and the specific geometry of the chains.

Among other organic polymers which may be used are chlorinated hydrocarbon polymers derived from starting material such as polypropylene, polyisobutylene, poly (3-methyl-1-butene), polycyclobutene, polyisopentene, polyisohexene, polyisoheptene including isomers and higher members of the homologous series. For these polymers to be stable in thionyl chloride and other oxyhalide electrolytes, they must be chlorinated sufficiently so that at least alternative carbons are chlorinated such as is the case for polyvinyl chloride. Polyvinyl fluoride, polyvinylidene fluoride, and their copolymers are also suitable. Other suitable materials include similar polymers but with other substituants such as bromine replacing all or part of the chlorine and fluorine. Additional substituant groups include: —$SO_3Li$ (lithium sulfonate), —SOCl (sulfinyl chloride), —$SO_2Cl_2$ (sulfonyl chloride), —CN (nitrile), —$NH_3^+$ (ammonium), and —$N(CH_3)_3^+$ (trimethyl ammonium).

The amount of thermally activated additive to be used in cells is dependent on a variety of factors such as the cell design, intended application, and performance requirements. The amount of additive is from 1.0 to 35 wt % of the electrolytic solution on dissolution of the additive at temperatures above about 100° C. Design factors that influence the amount of additive required include the size of the cell, the electrode surface area, the thickness and thermal conductivity of the electrode structure, and the heat transfer characteristics between components within the cell. The amount of additive required also depends on the ambient temperatures expected during service and the heat transfer characteristics of the external environment.

Figure 1:
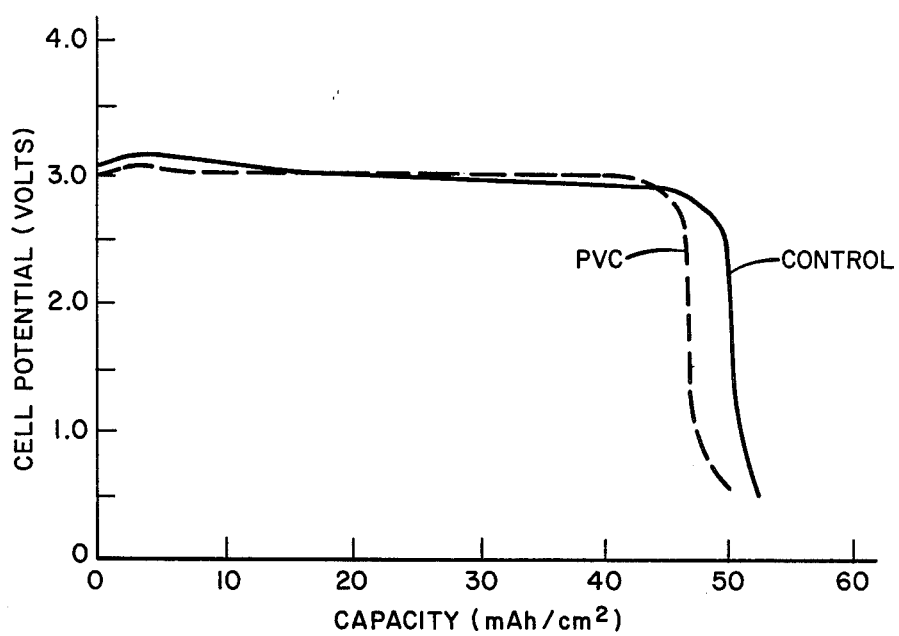
FIG. 1 shows discharge curves of a cell containing an additive in accordance with the present invention and of a control cell.

For a better understanding of the present invention together with other and further objects, advantages, and capabilities thereof, reference is made to the following discussion and appended claims in connection with the above-described drawings.

DETAILED DESCRIPTION OF THE INVENTION

In electrochemical cells of the type under discussion the anode is an oxidizable material. Preferably, as is well-known in the art, the anode contains lithium as the active material. Other oxidizable materials which may be employed in electrochemical cells of this type include other alkali metals and also alkaline earth metals.

The inert cathode current collectors may be of any material which is inert to the other components of the cell and sufficiently electrically conductive to draw off the current that is being produced by the cell. Typically, the current collector is a nickel, nickel alloy, or stainless steel grid or screen having applied to it an inert and electrically conductive material such as carbon black, graphite, or other electrically conductive material of high surface area. These materials preferably contain binding agents which hold them together and maintain them in position on the screen.

The cell contains an electrolytic solution which includes a solvent of a reducible liquid cathode material. Among the cathode materials found useful are fluid oxyhalides, fluid non-metallic oxides, fluid non-metallic halides, and mixtures thereof. Oxyhalides of sulfur and phosphorus have been found particularly useful and for very practical reasons thionyl chloride and sulfuryl chloride have been very widely used. Electrolyte solutes are added to the solvent in order to raise the conductivity of the solution since the cathode solvent materials typically are of low conductivity. A preferred solute is lithium tetrachloroaluminate. A thorough discussion of various useful anode materials, cathode solvents, and electrolyte solutes is provided in U.S. Pat. No. 4,219,443, issued Aug. 26, 1980, in the names of Keith A. Klinedinst and Francis G. Murphy and assigned to the assignee of the present application, which patent is incorporated herein by reference.

According to the present invention a thermally activated electrolyte additive is included in the electrolytic solution. This additive includes a material which is inert and substantially insoluble at temperatures below about 70° C. and which dissolves at elevated temperatures produced by abnormal operation of the cell. The additive material, for example polyvinyl chloride, is introduced into the electrolytic solution and dispersed throughout it in the form of a gel of polyvinyl chloride and the reducible liquid cathode material, for example thionyl chloride. The polyvinyl chloride-thionyl chloride gel formulation employed as an electrolyte additive may or may not contain solute, for example lithium tetrachloroaluminate. The inclusion of substantial amounts of lithium tetrachloroaluminate in the gel is preferred in applications in which it is important that the cell performance return to normal after the cell has cooled subsequent to overheating to a point where the additive has been substantially fully dissolved. Under such circumstances if the additive gel does not contain lithium tetrachloroaluminate, the electrolytic solution would be partially depleted of lithium tetrachloroaluminate when the cell cools. A new gel would have reformed containing some of the lithium tetrachloroaluminate originally employed as the solute, thus depriving the electroytic solution of sufficient solute for proper operation of the cell.

A suitable thermally activated additive for use in high-rate lithium-thionyl chloride cells may be prepared in accordance with the following example.

EXAMPLE I

Approximately 10 g of a low molecular weight suspension type polyvinyl chloride homopolymer with a 0.49 inherent viscosity is placed in a Soxhlet extraction apparatus and dissolved with 100 ml of high purity boiling thionyl chloride over a period of days. The measurement of inherent viscosity is carried out according to ASTM method D 1755. All the polyvinyl chloride dissolves in the thionyl chloride. The solution is concentrated by the evaporation of thionyl chloride until the solution is 15.1 wt % polyvinyl chloride and turns into a gel at 23° C. To 30.1 g of this polyvinyl chloride-thionyl chloride gel 15.1 ml of 1.8 M lithium tetrachloroaluminate-thionyl chloride solution is added and the resulting viscous solution is thoroughly mixed. Then 28.9 g of thionyl chloride is removed by vacuum evaporation to produce a polyvinyl chloride-lithium tetrachloroaluminate-thionyl chloride gel which is 16.8 wt % polyvinyl chloride.

EXAMPLE II

FIG. 1 shows discharge curves for two electrochemical cells, one a control cell and the other an identical cell except for the addition of a polyvinyl chloride additive. Both cells were lithium-thionyl chloride cells containing 1.8 M lithium tetrachloroaluminate-thionyl chloride electrolytic solution and a single 2.0×2.0 cm carbon cathode approximately 0.9 mm thick sandwiched between two 2.2×2.2 cm lithium anodes. The cells were discharged at ~6.8 mA/cm$^2$ at 23° C. The discharge load across the cells was 55 ohms. The additive was a polyvinyl chloride-lithium tetrachloroaluminate-thionyl chloride gel of 16.5 wt % polyvinyl chloride prepared generally in accordance with the procedure of Example I. 14.45 g of 16.5 wt % polyvinyl chloride gel was added to 33.8 g of the electrolytic solution to provide a solution of 4.9 wt % polyvinyl chloride. The gel dissolved at approximately 90° C.

EXAMPLE III

Figure 2:
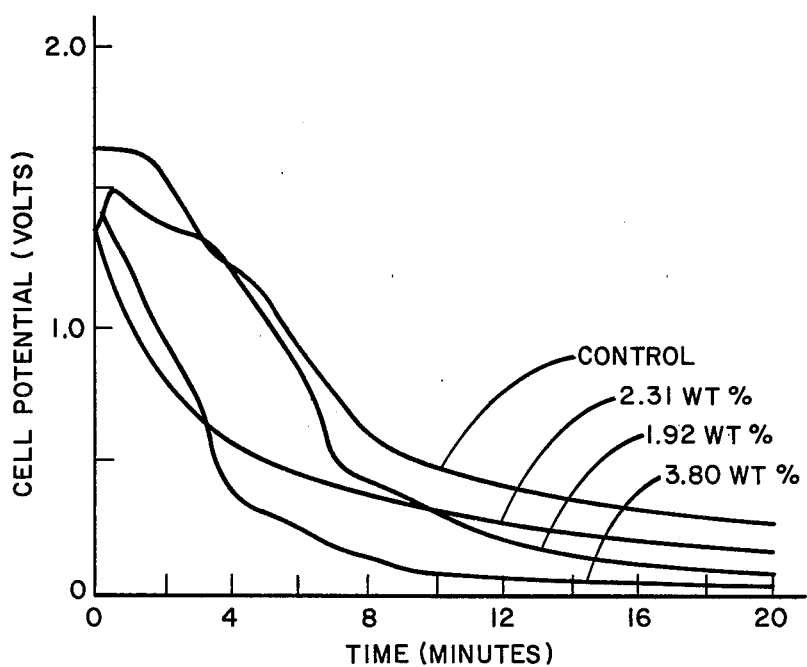
FIG. 2 illustrates curves of cell potential versus time for cells having different amounts of a polyvinyl chloride additive and for a control cell.

FIG. 2 is a set of curves of cell potential with time for a control cell and similar cells containing different amounts of a polyvinyl chloride additive. A gel with 12.65 wt % polyvinyl chloride was produced generally in accordance with the steps of Example I. The electrolytic solution for the cells was 1.8 lithium tetrachloroaluminate in thionyl chloride. Amounts of 7.40 g, 11.15 g, and 15.41 g of the 12.65 wt % polyvinyl chloride gel were added to 41.42 g, 43.18 g, and 36.09 g of the electrolytic solution to produce cells having 1.92, 2.31, and 3.80 wt % polyvinyl chloride, respectively, on dissolution of the gel at 95° C. Each cell was discharged with a 2.0 ohm load ($\approx$90 mA/cm$^2$) at a temperature of 95° C.

EXAMPLE IV

Figure 3:
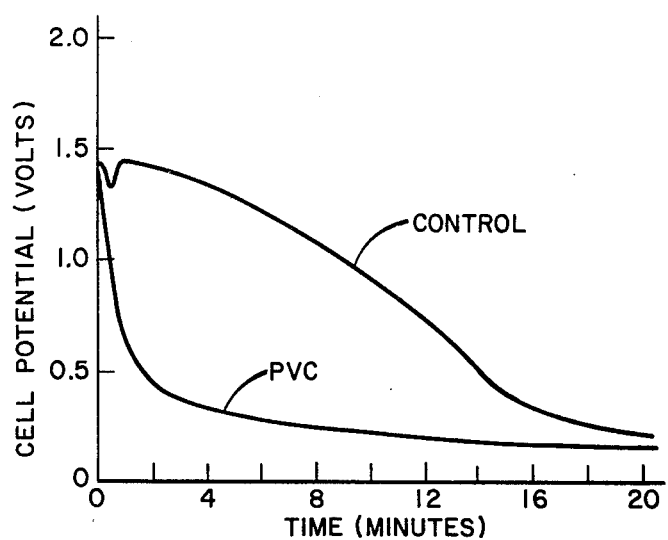
FIG. 3 shows curves of cell potential versus time for an AA size cell containing a polyvinyl chloride additive and for a control cell.

FIG. 3 shows curves of cell potential with time for a control cell and a similar cell with polyvinyl chloride additive. A gel containing 12.65 wt % polyvinyl chloride prepared generally as in previous examples was suspended in 1.8 M lithium tetrachloroaluminate-thionyl chloride solution in an amount to provide 4.17 wt % polyvinyl chloride on dissolution at approximately 90° C. The cells were of AA size with a 0.030 in. thick lithium anode pressed on the inside of the tubular cell case to a height of 1.50 in. and a cylindrical porous carbon cathode (height 1.05 in., diameter 0.406 in.). Each cell was discharged across a 1.25 ohm load ($\approx$90 mA/cm$^2$) at a temperature of 95° C.

EXAMPLE V

Figure 4:
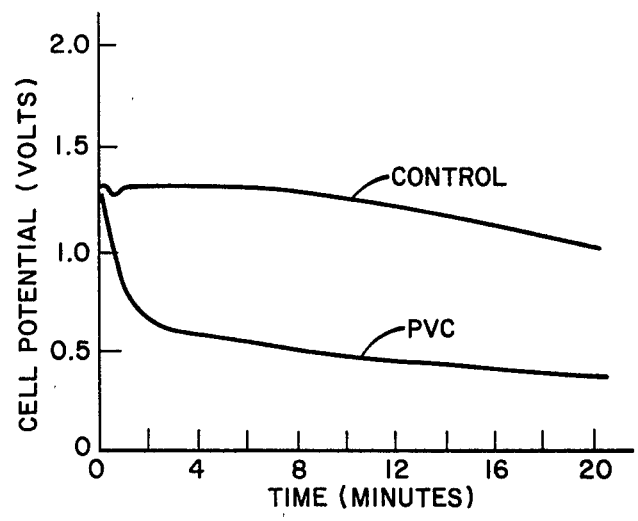
FIG. 4 shows curves of cell potential versus time for an AA size cell containing a polyvinyl chloride additive and for a control cell.

FIG. 4 illustrates curves of cell potential versus time for an AA size control cell and a similar cell having a polyvinyl chloride gel additive. The AA size cells were similar to those in Example IV except the cathode height was 1.45 in. The gel additive contained 12.65 wt % polyvinyl chloride. An amount of gel was added to a 1.8 M lithium tetrachloroaluminate-thionyl chloride solution to provide a solution of 1.90 wt % polyvinyl chloride on dissolution of the gel at approximately 90° C. The cells were discharged across 1.25 ohm loads at a temperature of 95° C.

EXAMPLE VI

Figure 5:
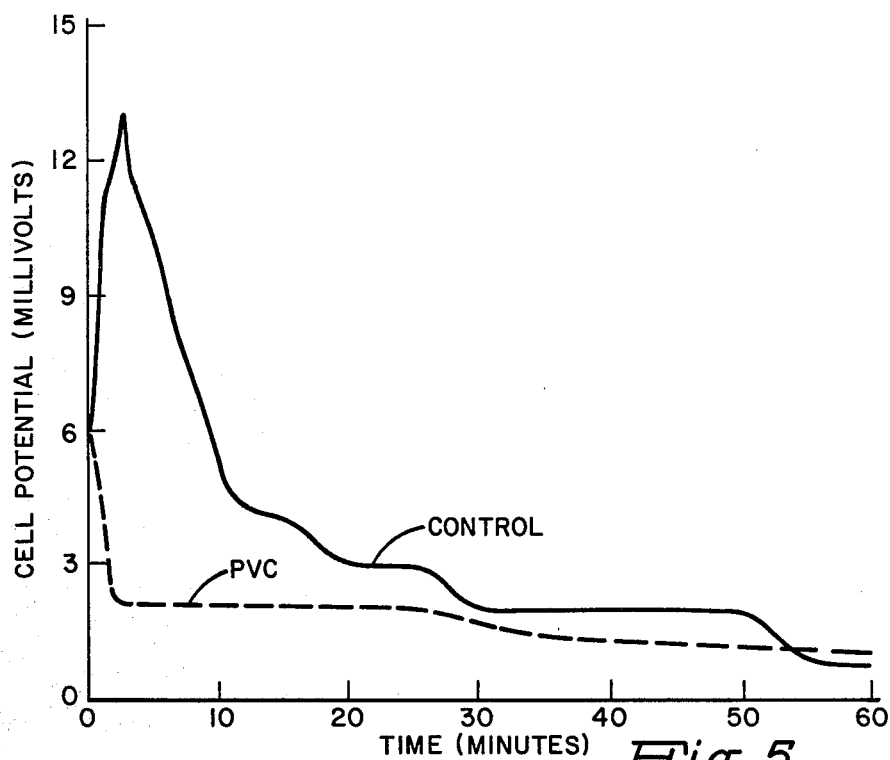
FIGS. 5, 6, and 7 show curves of cell potential, current, and temperature, respectively, versus time for a cell containing a polyvinyl chloride additive during short circuit and for a control cell under similar conditions.
Figure 6:
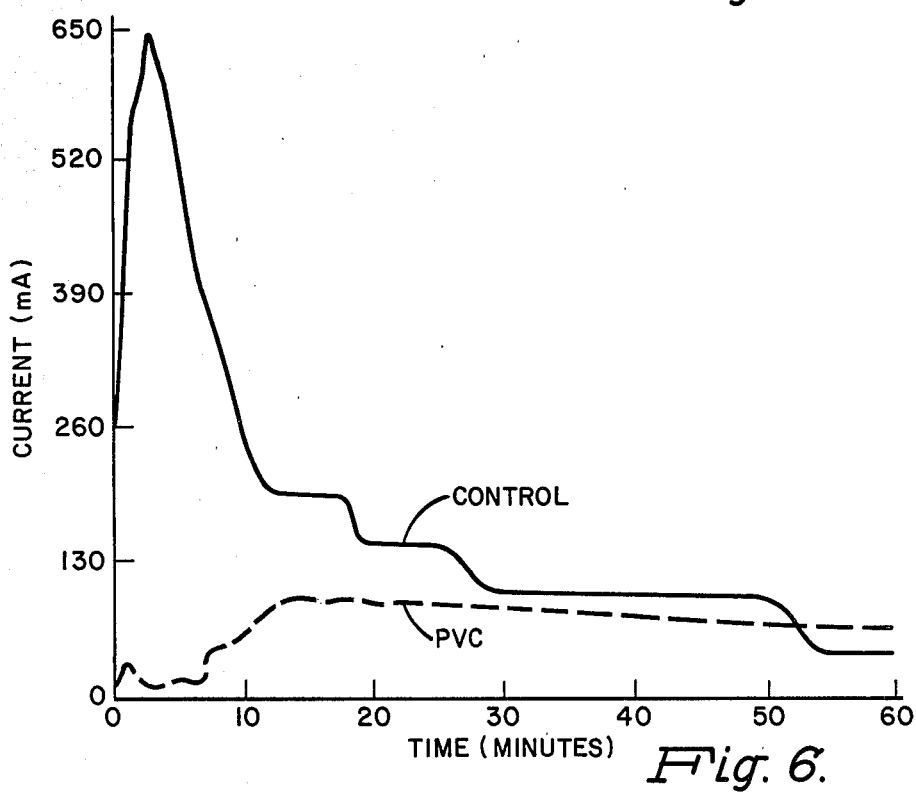
Figure 7:
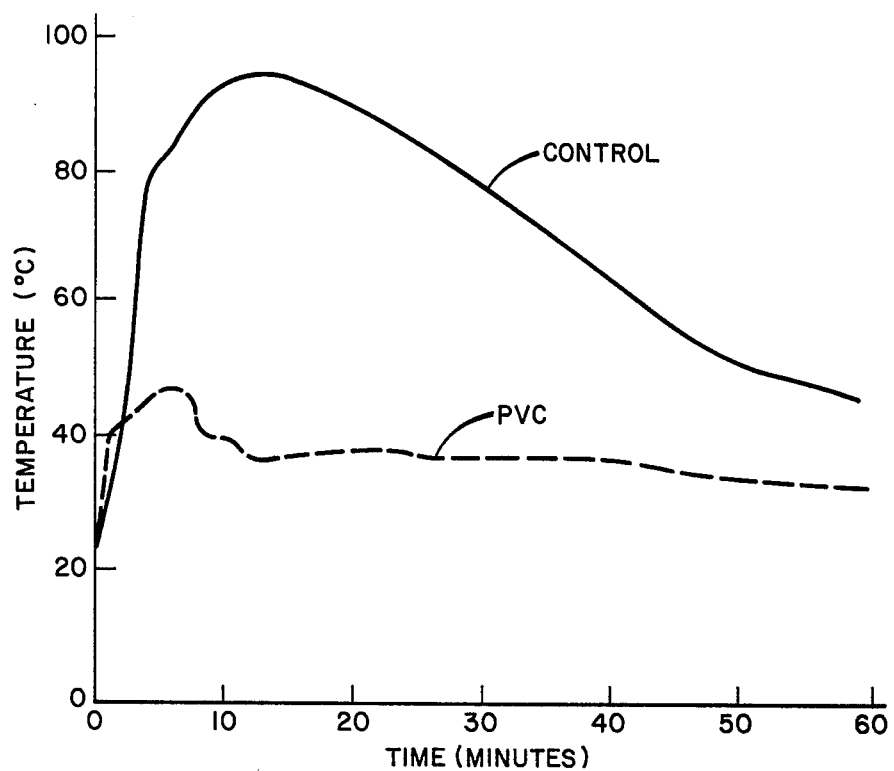

FIGS. 5, 6, and 7 illustrate curves of cell potential, current flow, and outside can temperature, respectively, with time for experimental and control AA size lithium-thionyl chloride cells under short circuit conditions. The AA size cells were similar to those in Example IV. The experimental cell contained 20 wt % of a polyvinyl chloride-lithium tetrachloroaluminate-thionyl chloride gel with 12.65 wt % polyvinyl chloride to provide an electrolytic solution containing 2.53 wt % polyvinyl chloride when the gel dissolved at approximately 90° C. The electrolytic solutions of the experimental and control cell were 1.8 M lithium tetrachloroaluminate in thionyl chloride. Both cells were externally shorted with 0.0050 ohm shunts. The starting external temperature was approximately 25° C.

While there has been shown and described what are considered preferred embodiments of the present invention, it will be obvious to those skilled in the art that various changes and modifications may be made therein without departing from the invention as defined by the appended claims.

What is claimed is:

1. An electrochemical cell comprising
   an oxidizable anode material;
   a cathode current collector;
   an electrolytic solution, in contact with the anode material and the cathode current collector, comprising a solvent of a reducible liquid cathode material and an electrolyte solute dissolved therein; and
   an additive dispersed throughout the electrolytic solution, said additive including material which is substantially insoluble in the electrolytic solution during normal operation of the cell and which becomes soluble in the electrolytic solution at temperatures above the temperature produced by normal operation of the cell whereby current flow through the cell is limited.

2. An electrochemical cell in accordance with claim 1 wherein
   said additive includes a material which is substantially insoluble in the electrolytic solution below about 70° C. and is substantially soluble in the electrolytic solution above about 100° C.

3. An electrochemical cell in accordance with claim 2 wherein
   said additive includes a partially halogenated alkane polymer having a molecular weight greater than 500.

4. An electrochemical cell in accordance with claim 3 wherein
   the material in said additive is present in an amount of from 1.0 wt % to 35 wt % of the electrolytic solution on dissolution of the material at temperatures above about 100° C.

5. An electrochemical cell in accordance with claim 2 wherein
   said additive includes a material selected from the group consisting of polyvinyl chloride, polyvinylidene chloride-vinyl chloride copolymer (Saran B), and chlorinated polyethylene.

6. An electrochemical cell in accordance with claim 2 wherein
   said additive is a gel of the reducible liquid cathode material and polyvinyl chloride.

7. An electrochemical cell in accordance with claim 6 wherein
said gel also includes electrolyte solute dissolved in the reducible liquid cathode material.

8. An electrochemical cell in accordance with claim 6 wherein
said reducible liquid cathode material is selected from the group consisting of fluid oxyhalides, fluid non-metallic oxides, fluid non-metallic halides, and mixtures thereof.

9. An electrochemical cell in accordance with claim 8 wherein
the oxidizable anode material is selected from the group consisting of alkali metals and alkaline earth metals.

10. An electrochemical cell in accordance with claim 9 wherein
said reducible liquid cathode material is thionyl chloride, and the oxidizable anode material is lithium metal.

* * * * *